(12) United States Patent
Gupta et al.

(10) Patent No.: US 10,640,041 B2
(45) Date of Patent: *May 5, 2020

(54) METHOD FOR DYNAMICALLY CALIBRATING VEHICULAR CAMERAS

(71) Applicant: MAGNA ELECTRONICS INC., Auburn Hills, MI (US)

(72) Inventors: Nikhil Gupta, Brampton (CA); Hilda Faraji, Toronto (CA); Daan He, Toronto (CA); Ghanshyam Rathi, Mississauga (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,178

(22) Filed: Feb. 4, 2019

(65) Prior Publication Data

US 2019/0168670 A1 Jun. 6, 2019

Related U.S. Application Data

(63) Continuation of application No. 15/161,711, filed on May 23, 2016, now Pat. No. 10,202,077, which is a
(Continued)

(51) Int. Cl.
*G06T 7/80* (2017.01)
*B60R 1/06* (2006.01)
(Continued)

(52) U.S. Cl.
CPC .................. *B60R 1/00* (2013.01); *G06T 7/80* (2017.01); *H04N 17/00* (2013.01);
(Continued)

(58) Field of Classification Search
CPC .................................... G06T 7/80; B60R 1/06
(Continued)

(56) References Cited

U.S. PATENT DOCUMENTS 4,961,625 A  10/1990 Wood et al.
4,966,441 A  10/1990 Conner
(Continued)

FOREIGN PATENT DOCUMENTS

EP  0353200 A2  1/1990
EP  0361914 A2  4/1990
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Jeremiah C Hallenbeck-Huber
(74) *Attorney, Agent, or Firm* — Honigman LLP

(57) ABSTRACT

A method for dynamically calibrating without manual intervention a forward viewing vehicular camera with respect to its three rotational degrees of freedom includes disposing a camera at a vehicle and operating the camera to acquire multiple frames of image data as the vehicle is moving and steered through a plurality of steering angles. Feature points are determined in an image frame when the vehicle is steered within a respective range of steering angles and motion trajectories of those feature points are tracked in subsequent image frames for the respective range of steering angles. A vanishing point is established in the image plane for the feature points for the respective range of steering angles. Based on established vanishing points, a vanishing line is determined. When the vanishing line is determined to be non-horizontal, at least one of pitch, roll or yaw of the camera is adjusted.

24 Claims, 16 Drawing Sheets

PLOT OF OPTICAL FLOW TRAJECTORIES AND VANISHING POINT

Related U.S. Application Data continuation of application No. 14/113,414, filed as application No. PCT/CA2012/000056 on Jan. 20, 2012, now Pat. No. 9,357,208.

(60) Provisional application No. 61/478,711, filed on Apr. 25, 2011.

(51) Int. Cl.
*B60R 1/00* (2006.01)
*H04N 17/00* (2006.01)

(52) U.S. Cl.
CPC ...... *H04N 17/002* (2013.01); *B60R 2300/105* (2013.01); *B60R 2300/402* (2013.01); *B60R 2300/8086* (2013.01); *B60R 2300/8093* (2013.01); *G06T 2207/30252* (2013.01)

(58) Field of Classification Search
USPC .......................................................... 348/148
See application file for complete search history.

(56) References Cited

U.S. PATENT DOCUMENTS

| | | |
|---|---|---|
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,148,014 A | 9/1992 | Lynam et al. |
| 5,166,681 A | 11/1992 | Bottesch et al. |
| 5,177,606 A | 1/1993 | Koshizawa |
| 5,182,502 A | 1/1993 | Slotkowski et al. |
| 5,193,029 A | 3/1993 | Schofield et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Fads |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,445,287 B1 | 9/2002 | Schofield et al. |
| 6,477,464 B2 | 11/2002 | McCarthy et al. |
| 6,498,620 B2 | 12/2002 | Schofield et al. |
| 6,515,378 B2 | 2/2003 | Drummond et al. |
| 6,516,664 B2 | 2/2003 | Lynam |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |

(56) References Cited

U.S. PATENT DOCUMENTS

| | | |
|---|---|---|
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,227,459 B2 | 6/2007 | Bos et al. |
| 7,227,611 B2 | 6/2007 | Hull et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,375,803 B1 | 5/2008 | Bamji |
| 7,380,948 B2 | 6/2008 | Schofield et al. |
| 7,388,182 B2 | 6/2008 | Schofield et al. |
| 7,423,821 B2 | 9/2008 | Bechtel et al. |
| 7,425,076 B2 | 9/2008 | Schofield et al. |
| 7,502,048 B2 | 3/2009 | Okamoto et al. |
| 7,526,103 B2 | 4/2009 | Schofield et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,881,496 B2 | 2/2011 | Camilleri et al. |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,059,154 B1 | 11/2011 | Kiro et al. |
| 8,064,643 B2 | 11/2011 | Stein et al. |
| 8,082,101 B2 | 12/2011 | Stein et al. |
| 8,100,568 B2 | 1/2012 | DeLine et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,487,991 B2 | 7/2013 | Zhang et al. |
| 8,534,887 B2 | 9/2013 | DeLine et al. |
| 8,553,088 B2 | 10/2013 | Stein et al. |
| 9,357,208 B2 | 5/2016 | Gupta et al. |
| 10,202,077 B2 | 2/2019 | Gupta et al. |
| 2002/0005778 A1 | 1/2002 | Breed et al. |
| 2002/0011611 A1 | 1/2002 | Huang et al. |
| 2002/0036692 A1 | 3/2002 | Okada |
| 2002/0113873 A1 | 8/2002 | Williams |
| 2003/0021490 A1 | 1/2003 | Okamoto et al. |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0152580 A1 | 7/2005 | Furukawa et al. |
| 2005/0219852 A1 | 10/2005 | Stam et al. |
| 2005/0237385 A1 | 10/2005 | Kosaka et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2007/0024724 A1 | 2/2007 | Stein et al. |
| 2007/0104476 A1 | 5/2007 | Yasutomi et al. |
| 2007/0165108 A1 | 7/2007 | Yuasa et al. |
| 2007/0165909 A1 | 7/2007 | Leleve et al. |
| 2007/0242339 A1 | 10/2007 | Bradley |
| 2008/0007619 A1 | 1/2008 | Shima et al. |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0179916 A1 | 7/2009 | Williams et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2010/0097455 A1 | 4/2010 | Zhang et al. |
| 2010/0104137 A1 | 4/2010 | Zhang et al. |
| 2010/0165102 A1 | 7/2010 | Klebanov et al. |
| 2010/0201814 A1 | 8/2010 | Zhang et al. |
| 2010/0214791 A1 | 8/2010 | Schofield |
| 2010/0295948 A1 | 11/2010 | Xie et al. |
| 2010/0322476 A1 | 12/2010 | Kanhere et al. |
| 2010/0329513 A1 | 12/2010 | Klefenz |
| 2011/0115912 A1 | 5/2011 | Kuehnle |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0081512 A1 | 4/2012 | Shimizu |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0169627 A1 | 6/2014 | Gupta |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2017/0177953 A1 | 6/2017 | Stein |

FOREIGN PATENT DOCUMENTS

| | | |
|---|---|---|
| EP | 0640903 A1 | 3/1995 |
| EP | 0697641 A2 | 2/1996 |

(56) References Cited

FOREIGN PATENT DOCUMENTS

| | | |
|---|---|---|
| EP | 1115250 A1 | 7/2001 |
| EP | 2377094 A1 | 10/2011 |
| EP | 2667325 A1 | 11/2013 |
| GB | 2233530 A | 1/1991 |
| JP | S5539843 A | 3/1980 |
| JP | S58110334 A | 6/1983 |
| JP | 6272245 | 5/1987 |
| JP | S62131837 A | 6/1987 |
| JP | 01123587 | 5/1989 |
| JP | H1168538 A | 7/1989 |
| JP | H236417 | 8/1990 |
| JP | 3099952 | 4/1991 |
| JP | 6227318 B2 | 8/1994 |
| JP | 07105496 | 4/1995 |
| JP | 2630604 | 7/1997 |
| JP | 200274339 A | 3/2002 |
| JP | 20041658 A | 1/2004 |
| JP | 6216073 B2 | 10/2017 |
| WO | 1994019212 A2 | 9/1994 |
| WO | 1996038319 A2 | 12/1996 |
| WO | 2010146695 A1 | 12/2010 |
| WO | 2012139636 A1 | 10/2012 |
| WO | 2012139660 A1 | 10/2012 |
| WO | 2012143036 A1 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.

Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing CO., 1999.

Broggi et al., "Multi-Resolution Vehicle Detection using Artificial Vision," IEEE Intelligent Vehicles Symposium of Jun. 2004.

Franke et al., "Autonomous driving approaches downtown", Intelligent Systems and Their Applications, IEEE 13 (6), 40-48, Nov./Dec. 1999.

IEEE 100—The Authoritative Dictionary of IEEE Standards Terms, 7th Ed. (2000).

Kastrinaki et al., "A survey of video processing techniques for traffic applications".

Philomin et al., "Pedestrain Tracking from a Moving Vehicle".

Sahli et al., "A Kalman Filter-Based Update Scheme for Road Following," IAPR Workshop on Machine Vision Applications, pp. 5-9, Nov. 12-14, 1996.

Sun et al., "On-road vehicle detection using optical sensors: a review", IEEE Conference on Intelligent Transportation Systems, 2004.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Van Leeuwen et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Vlacic et al. (Eds), "Intelligent Vehicle Tecnologies, Theory and Applications", Society of Automotive Engineers Inc., edited by SAE International, 2001.

Zheng et al., "An Adaptive System for Traffic Sign Recognition," IEEE Proceedings of the Intelligent Vehicles '94 Symposium, pp. 165-170 (Oct. 1994).

International Search Report dated Apr. 30, 2012 from corresponding PCT Application No. PCT/CA2012/000056.

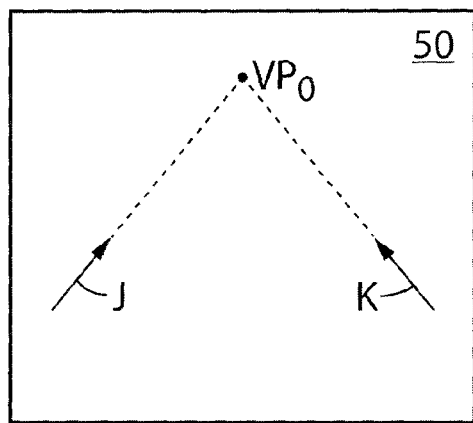 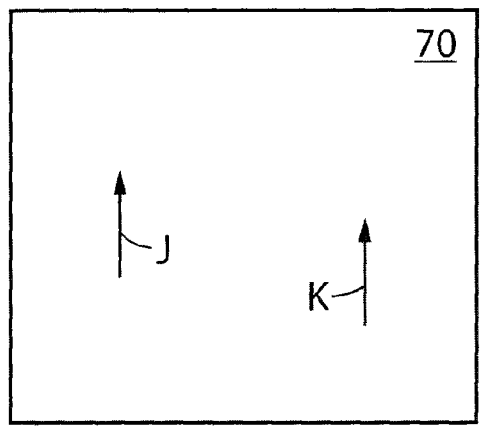
FIG.5            FIG.7
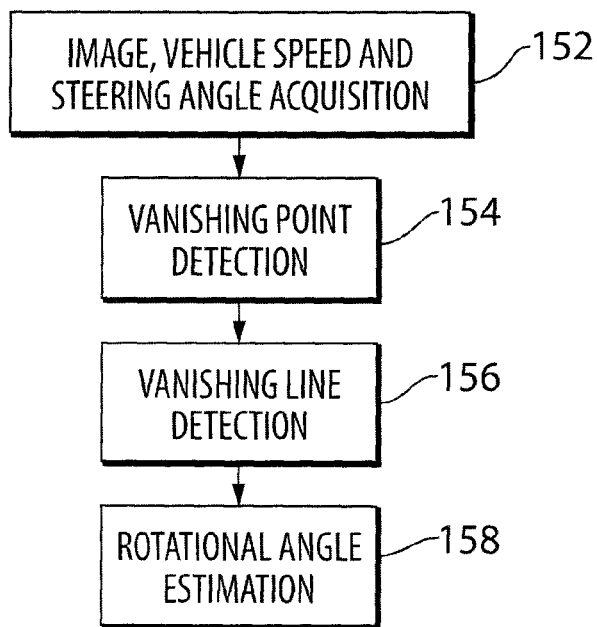
FIG.9

GENERAL HISTOGRAM OF STEERING BIN DISTRIBUTION

PLOT OF STEERING BINS WITH VARYING WIDTHS

PLOT OF OPTICAL FLOW TRAJECTORIES AND VANISHING POINT

If speed bin has changed
   Update the trajectory structure
End
   If bin angle not changed
      If we have reached the threshold for the number of trajectories
      per steering wheel bin
- Estimate the vanishing point and output the unwarped
  VP values to the vanishing line block
- Reset the features and trajectories for the specified steering bin
- New feature extraction
- Start tracking
- Read the updated trajectory structure

Else
      Either continues tracking the features/ OR
      In case of no features, pending
      If we have reached the number of pre-configured frame set
         For each feature tracking path
           if there is enough data points
- Un-distort trajectory data
- Robust regression of the trajectory pat and post filtering
- Storing trajectory properties and the features in the trajectory structure end
      End
- Reset the feature paths
- New feature extraction
- Start tracking

End
   End
   Else (steering bin is changed)
- Save the selected trajectories
- New feature extraction
- Start tracking for the new steering bin angle
- Update the new trajectory structure if necessary
- Reset the counter and assign the first frame as the current frame. These two parameters are used for the condition in which there are enough frames to collect and record the trajectories.
- Read the updated trajectory structure

End

FIG.16

METHOD FOR DYNAMICALLY CALIBRATING VEHICULAR CAMERAS

CROSS-REFERENCE TO RELATED APPLICATIONS

The present application is a continuation of U.S. patent application Ser. No. 15/161,711, filed May 23, 2016, now U.S. Pat. No. 10,202,077, which is a continuation of U.S. patent application Ser. No. 14/113,414, filed Oct. 23, 2013, now U.S. Pat. No. 9,357,208, which is a 371 national phase application of PCT Application No. PCT/CA2012/000056, filed Jan. 20, 2012, which claims priority to U.S. Provisional Application Ser. No. 61/478,711, filed Apr. 25, 2011, the contents of which are incorporated by reference herein in their entirety.

FIELD OF INVENTION

The invention relates to the field of vehicular cameras, and more particularly to methods and systems for dynamically calibrating the position or alignment of a vehicular camera in the field.

BACKGROUND OF INVENTION

In an effort to provide drivers with a comprehensive view of their surroundings, vehicle manufacturers have recently proposed and marketed 360 degree vision systems which display a "bird's eye" view of the vehicle and its surroundings. Such 360 degree vision systems typically utilize four wide angle cameras, one at the front of the vehicle, one at the rear and two at the sides. The outputs of these four cameras are displayed together on single display screen to provide a 360 degree image. See, for example, FIGS. 1A, 1B, and 1C, which show a vehicle 10 and the location of cameras 12a-12d, respective camera images 14a-14d, and 360 degree image 16.

A problem arises in attempting to stitch together the aforesaid camera images into a single composite image in that each camera is not absolutely fixed in position. There are tolerances during the manufacture of the cameras and assembly into the vehicle. In addition, and more importantly, the positioning of each camera will vary over the life of the vehicle as it is driven and subjected to the rigours of the real world. Vibrations from bumpy roads and door slams, the effects of car washes and repair and replacement of various parts, as well as the movement of the pivoting side view mirror housings, can all have an effect of the position (including angular orientation) of the vehicular cameras.

For this reason, the commercial 360 degree vision systems are not seamless. Instead, to avoid having to deal with misalignment of and between the four cameras, the commercial systems basically display the images from the four cameras in four predetermined regions of the display, typically leaving buffer zones 17 between the four images as seen in FIG. 1C. In other words, the images from the four cameras are not seamlessly stitched together to provide a uniform composite 360 degree image 18 as shown in FIG. 1D, which is more visually appealing.

It is possible to calibrate each camera when the vehicle leaves the factory production line. An end of assembly line tester may be used to project predetermined targets in a controlled environment at known distances from the vehicle. Knowing the real physical position of various markers, it is possible to define a transfer function that maps camera pixel locations to real locations, and from this determine an offset to the nominal camera position. However, this end of line testing method does not solve the problem of being able to independently calibrate the cameras in the field, where there is no controlled environment in which pre-designated markers are situated at known locations. Simply put, it is not possible to use end-of-line assembly line calibration based on predetermined targets in a controlled environment to calibrate a vehicular camera in the field.

Each vehicular camera has six degrees of freedom, three linear (up-down, right-left, forward-backward) and three rotational (roll, pitch, and yaw). In attempting to stitch together the images from the four cameras based on predetermined demarcation lines defined with respect to nominally positioned cameras, it was noticed that changes in the three rotational degrees of freedom in particular result in a noticeable visual distortion in the composite 360 degrees image. Thus, it is particularly desired to calibrate the cameras with respect to the three rotational degrees of freedom.

The invention presents a method and system for dynamically ascertaining the position of a vehicular camera in the field, particularly with respect to its three rotational degrees of freedom, without manual intervention. The knowledge of the camera position may thus be used to calibrate the camera so as to seamlessly stitch together images from all four cameras. It will also be appreciated that the knowledge of camera position can also be used to calibrate the camera for a variety of other functions, for example, when one or more of the cameras are used for object detection, lane departure warning, automatic high beam control and other such driver assistance purposes.

SUMMARY OF INVENTION

Generally speaking, the invention dynamically calibrates a vehicular camera to ascertain its position, in at least the three rotational degrees of freedom, with respect to a vehicular frame of reference or common coordinate system.

According to this aspect of the invention a vehicular camera is independently calibrated using dynamic images obtained in the field. The calibration is carried out by utilizing the principle of vanishing points, wherein parallel lines in a scene meet at a vanishing point. The invention ascertains a vanishing line based on a locus of such vanishing points. The position of the vanishing line is correlated to the position of the vehicular camera, including in particular the angular positions thereof.

The first aspect of the invention can be better appreciated with respect to FIGS. 2A-2C and 3A-3C. FIG. 2A shows a ground plane 20, defined by X, Y coordinates. The ground plane is defined by the roadway. FIG. 3A shows an image plane 20' defined by x, y coordinates. The image plane 20' is provided in this example by the front facing camera 12a.

FIG. 2A also shows two lines 22a, 22b that are parallel with the Y-axis in the ground plane 20. However, these two lines 22a, 22b will be seen in the image plane 20' as non-parallel lines 22a', 22b' as shown in FIG. 3A. The non-parallel lines 22a', 22b' will meet at a central vanishing point $VP_0$ in the image plane 20'.

Similarly, referring additionally to FIG. 2B, other sets of parallel lines such as 32a, 32b and 34a, 34b that are angled with respect to the Y-axis ground plane 30 will be seen as non-parallel lines 32a', 32b' and 34a', 34b' in image plane 30', as shown in FIG. 3B. The non-parallel lines 32a', 32b' will meet at vanishing point $VP_1$ in the image plane 30' and the non-parallel lines 34a', 34b' will meet at vanishing point $VP_2$ in the image plane 30'. The locus of vanishing points $VP_0$, $VP_1$, $VP_2$ in the image plane 30' will yield a vanishing line VL. In circumstances where the camera is perfectly aligned with no rotational error as shown in FIG. 3B, the vanishing point $VP_0$ will be located at a preordained pixel position (such as at the horizontal centre of the image) and the vanishing line VL will be perfectly horizontal in the image plane 30' and located at a preordained vertical pixel height. Thus, FIG. 3B shows the situation in the image plane when the front facing camera is situated at its nominal position.

However, if the position including the rotational angles of the front camera has shifted then, as shown in the ground and image planes 30, 30" of FIGS. 2C, and 3C, the same ground plane conditions (FIG. 2C is identical to FIG. 2B) will generate shifted vanishing points $VP_0'$, $VP_1'$, $VP_2'$ and a shifted (and angled with respect to the horizontal) vanishing line VL' in the image plane. The changes in the central vanishing point $VP_0$ and in the vanishing line VL can be correlated in particular to changes in the angular positions or roll, pitch and yaw of the vehicular camera, enabling the camera to be independently calibrated.

To find parallel lines in a dynamic situation where the vehicle is in motion, this aspect of the invention selects a plurality of feature points in the scene and tracks the subsequent positions of these points in a set of image frames acquired from the camera video stream as the vehicle moves. Thus, for example, as shown in the schematic diagrams of FIGS. 4A-4C, feature point j (the base of a traffic sign pole on one side of the road) and feature point k (the base of a traffic sign pole on the other side of the road) are tracked at subsequent image frames 40, 42, 44. The pixel positions of these feature points will change over the subsequent image frames to yield, for example, vector J, comprising points ($x_0$, $y_0$), ($x_1$, $y_1$), . . . ($x_n$, $y_n$), in respect of feature point j, and vector K in respect of feature point k. The vectors J and K are graphed in an image plane 50 in FIG. 5, and can be extrapolated to ascertain the central vanishing point $VP_0$ in the image plane 50. The corresponding situation is shown in ground planes 60, 62, 64 of FIGS. 6A-6C, from which it should be appreciated that the motion of the vehicle relative to the feature points can be utilized to extract parallel lines J and K in the ground plane 70 as shown in FIG. 7.

In the situation just discussed, the vehicle is shown moving in a straight line so as to enable the central vanishing point to be determined. However, when the vehicle turns as a result of a change in its steering angle, the motion of the vehicle can be approximated over relatively short distances (approximately 0.5 to 2 seconds of travel time, depending of vehicle speed) as a straight motion at an angle with respect to the ground Y-axis. Repeating the foregoing process of extracting and tracking the trajectories of feature points for various steering angle ranges as the vehicle moves will enable other vanishing points to be determined, hence enabling the determination of the vanishing line.

Similar conditions and circumstances exist for the rear and side camera, but the exact relationship between changes in camera angular position and shifts in the central vanishing point and vanishing will differ.

From the foregoing then, it will be appreciated that one aspect of the invention provides a method of dynamically ascertaining the position or alignment of a vehicular camera relative to a vehicle to which the camera is attached. The method includes the steps of: (a) establishing a plurality of vehicular steering angle ranges; (b) acquiring a set of image frames in a video stream provided by the camera whilst the vehicle is in motion, the image frames defining an image plane; (c) measuring the steering angle of the vehicle and, for each steering angle range: (i) selecting a plurality of feature points in the image frames, (ii) tracking a motion trajectory of each selected feature point in the set of image frames, and (iii) determining a vanishing point in the image plane for the plurality of tracked motion trajectories; (d) determining a vanishing line in the image plane provided by the camera based on a locus of said vanishing points; and (e) determining the position or alignment of the camera based on the position of a central vanishing point (determined when the steering angle range encompasses 0 degrees) and the vanishing line.

BRIEF DESCRIPTION OF THE DRAWINGS

The foregoing and other aspects of the invention will be better understood with respect to the attached drawings, wherein:

FIG. 5 is a diagram showing vectors in the image plane derived from the motion trajectories of FIGS. 4A-4C;

FIG. 7 is a diagram showing vectors in the ground plane derived from the motion trajectories of FIGS. 6A-6C;

FIG. 9 is a block diagram of an online calibration algorithm executed by the 360 degree vision system for dynamically ascertaining the position, including angular rotations, of the front camera;

FIG. 16 provides pseudo code for the algorithm shown in FIG. 12;

DETAILED DESCRIPTION OF PREFERRED EMBODIMENTS

In this document, unless the context dictates otherwise, the following terms have the following meanings:

"ground plane" refers to a real plane parallel to the roadway.

"image plane" refers to a two-dimensional space provided as an output of a camera viewing a real three-dimensional space.

"plane at infinity" means all points at infinity, and refers to a plane that is perpendicular to the ground plane.

"horizon line" is the intersection of the ground plane with the plane at infinity.

"vanishing point" is a point at which parallel lines in the ground plane seem to converge in an image plane. If the camera is centered between two parallel lines in the ground plane which are parallel to the camera optical axis, the intersection of the two parallel lines is referred to as the "central vanishing point".

"principal point" refers to the central vanishing point of a camera when the camera is at its nominal installed position and orientation. This principal point is an intrinsic camera parameter and provided as part of the manufacturing data.

"vanishing line" is a locus of estimated vanishing points.

Figure 1A:
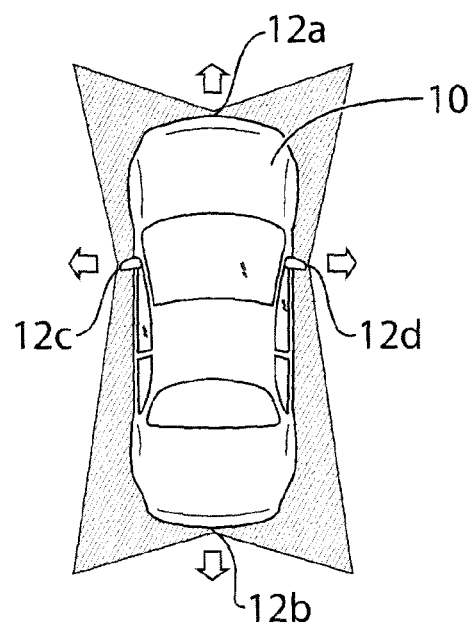
FIG. 1A is a schematic diagram of a vehicle having front, rear, and side facing vehicular cameras and the fields of view provided thereby.
Figure 1B:
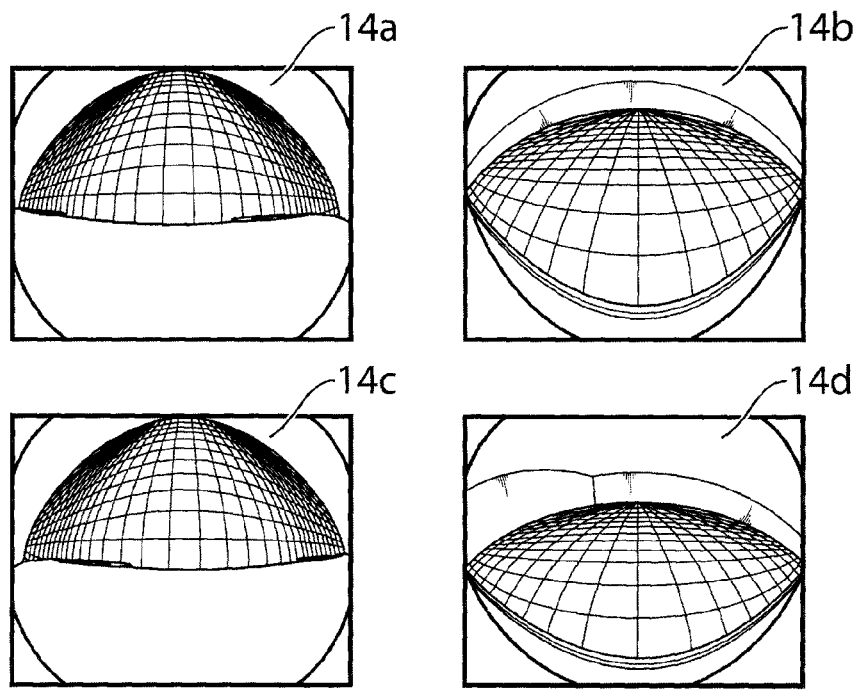
FIG. 1B is an example of images obtained by each of the four cameras shown in FIG. 1A.
Figure 1C:
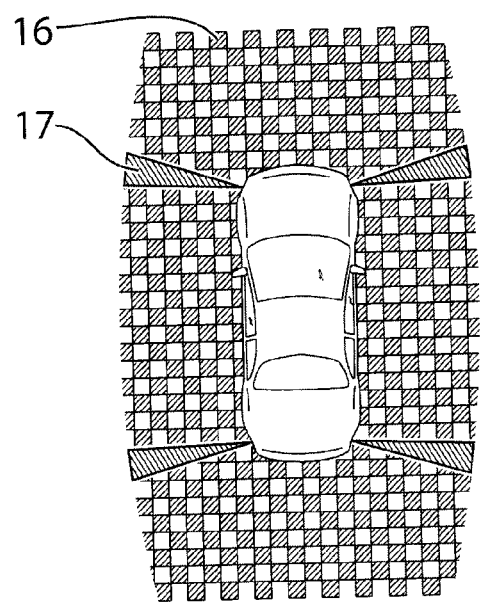
FIG. 1C is an image provided by a 360 degree vision system according to the prior art where the individual images provided by the cameras shown in FIG. 1B are not seamlessly stitched into a composite 360 degree image.
Figure 1D:
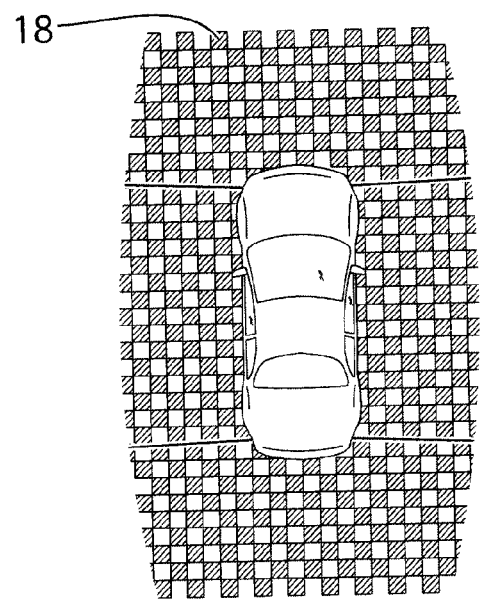
FIG. 1D is an image provided by a 360 degree vision system according to the preferred embodiment of the invention which seamlessly stitches together the individual images provided by the cameras as shown in FIG. 1B into a composite 360 degree image.
Figure 1E:
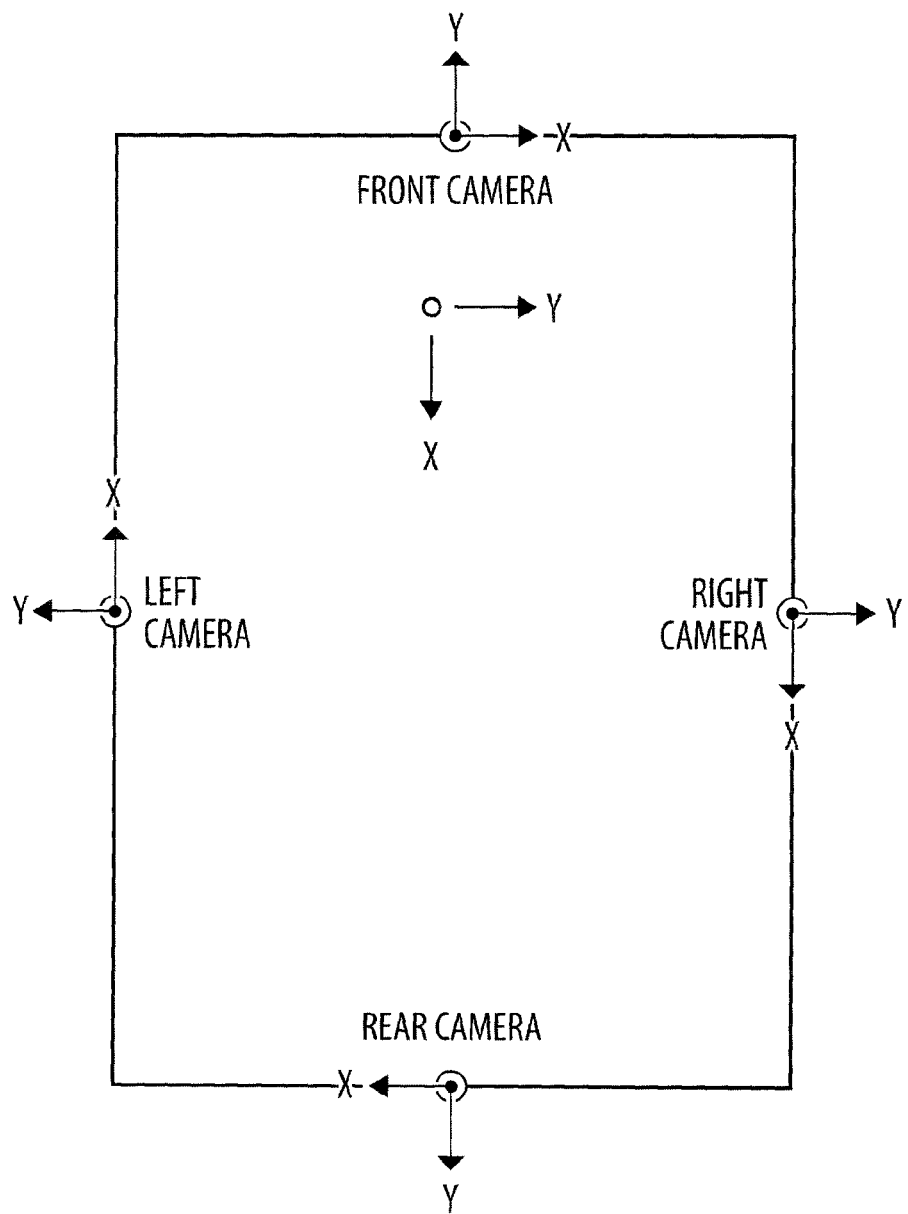
FIG. 1E is a diagram showing the relationships between individual camera coordinate systems and a vehicle coordinate system.
Figure 2A:
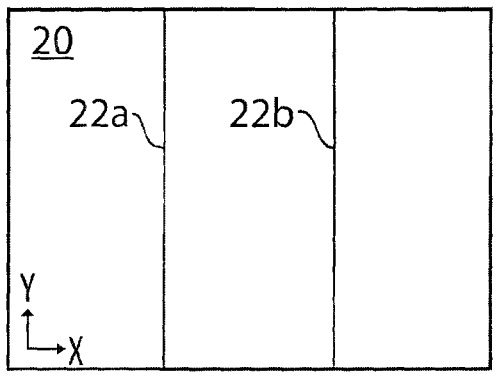
FIG. 2A is a diagram showing two lines parallel to a coordinate axis in a ground plane and FIG. 3A is a diagram showing the effect of these two parallel lines when projected onto an image plane provided by the camera in circumstances where the camera situated at its nominal position.
Figure 3A:
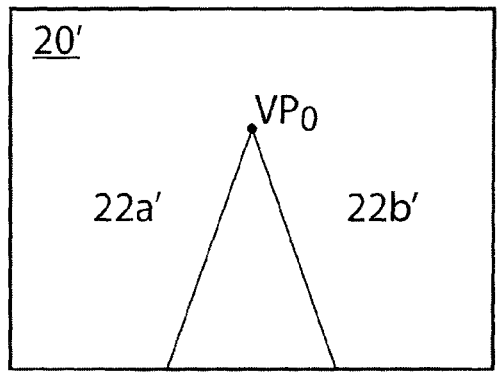
Figure 2B:
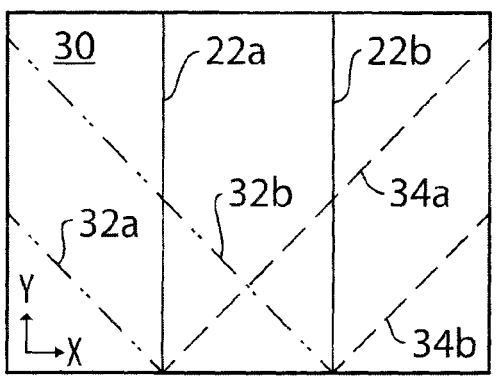
FIG. 2B is a diagram showing other parallel lines that are angled with respect to the coordinate axis in the ground plane of FIG. 2A
Figure 3B:
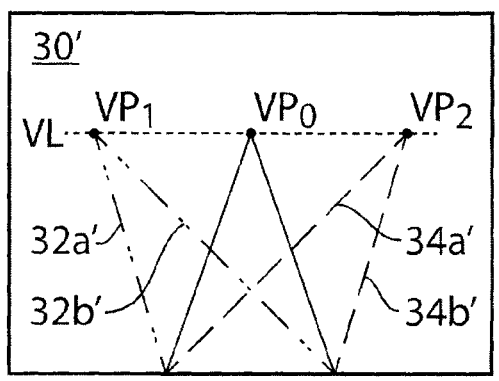
FIG. 3B is a diagram showing the effect of these other parallel lines when projected onto the image plane of FIG. 3A in circumstances where the camera situated at its nominal position.
Figure 2C:
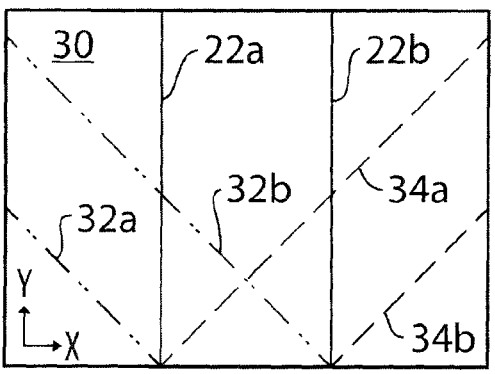
FIG. 2C is identical to FIG. 2B.
Figure 3C:
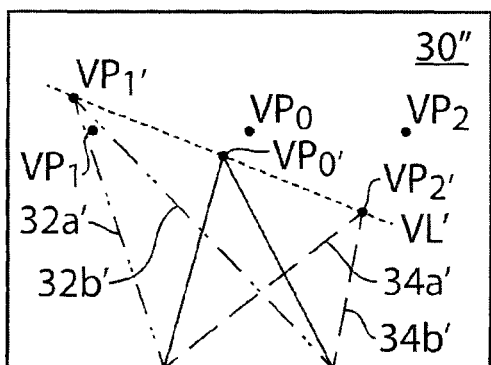
FIG. 3C is a diagram showing the sets of parallel lines in FIGS. 2A and 2B when projected onto the image plane provided by the camera in circumstances where the camera is NOT situated at its nominal position but has rotated.
Figure 4A:
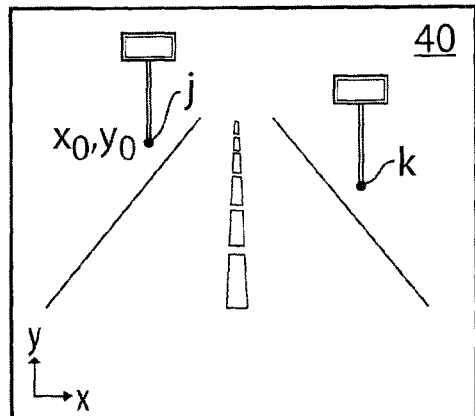
FIGS. 4A-4C are diagrams showing the motion trajectories of feature points over successive image frames in a video stream provided by the front camera.
Figure 6A:
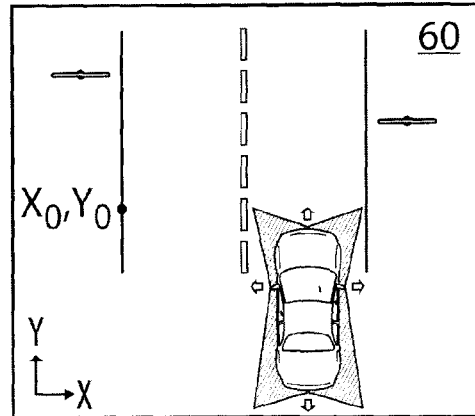
FIGS. 6A-6C are diagrams showing the corresponding motion trajectories of the feature points in FIGS. 4A-4C in the ground plane.
Figure 4B:
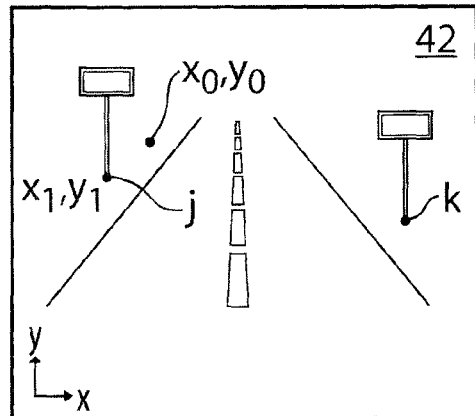
Figure 6B:
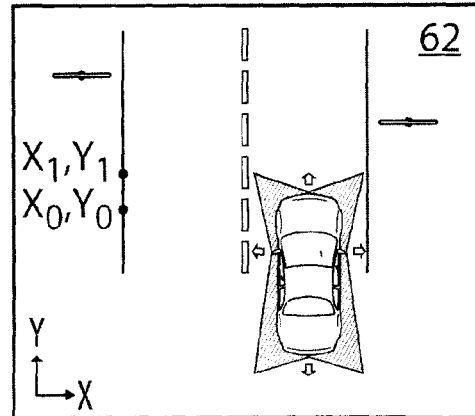
Figure 4C:
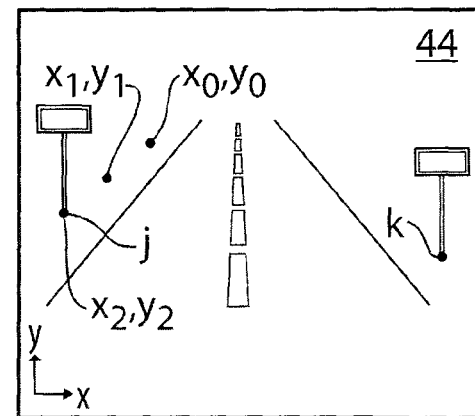
Figure 6C:
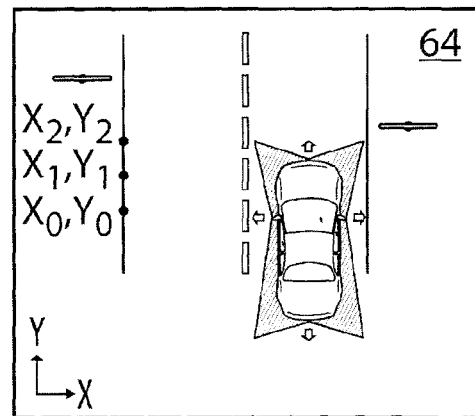

"camera rotational angles" are the angles that define the actual orientation of the camera. FIG. 1E shows the position of the four cameras with respect to the vehicle coordinate system. The right hand system is assumed to be positive for the rotations. Consider the total rotation of each camera to be defined in terms of its rotation around the individual camera coordinates: X axis (pitch or $\alpha$), Y axis (yaw or $\beta$) and Z axis (roll or $\gamma$). The rotations, by definition, are not commutative and thus, the order in which the camera is rotated around the different axes is important. For our purpose, the camera is first rolled, followed by yaw and then pitch, making the order of rotations as Z axis (roll)→Y axis (yaw)→X axis (pitch).

"de-warping" refers to a procedure for devolving distortions produced by a wide angle camera lens. In the preferred embodiment the vehicular camera employed for the 360 degree composite image is a very wide angle, omni-vision camera, so the original images are distorted. A de-warping procedure as known in the art per se is necessary to account for this distortion and to convert curvy trajectories to straight trajectories. Once the convergence point (vanishing point) is found, its coordinates are de-warped to give the final image coordinates.

Figure 8:
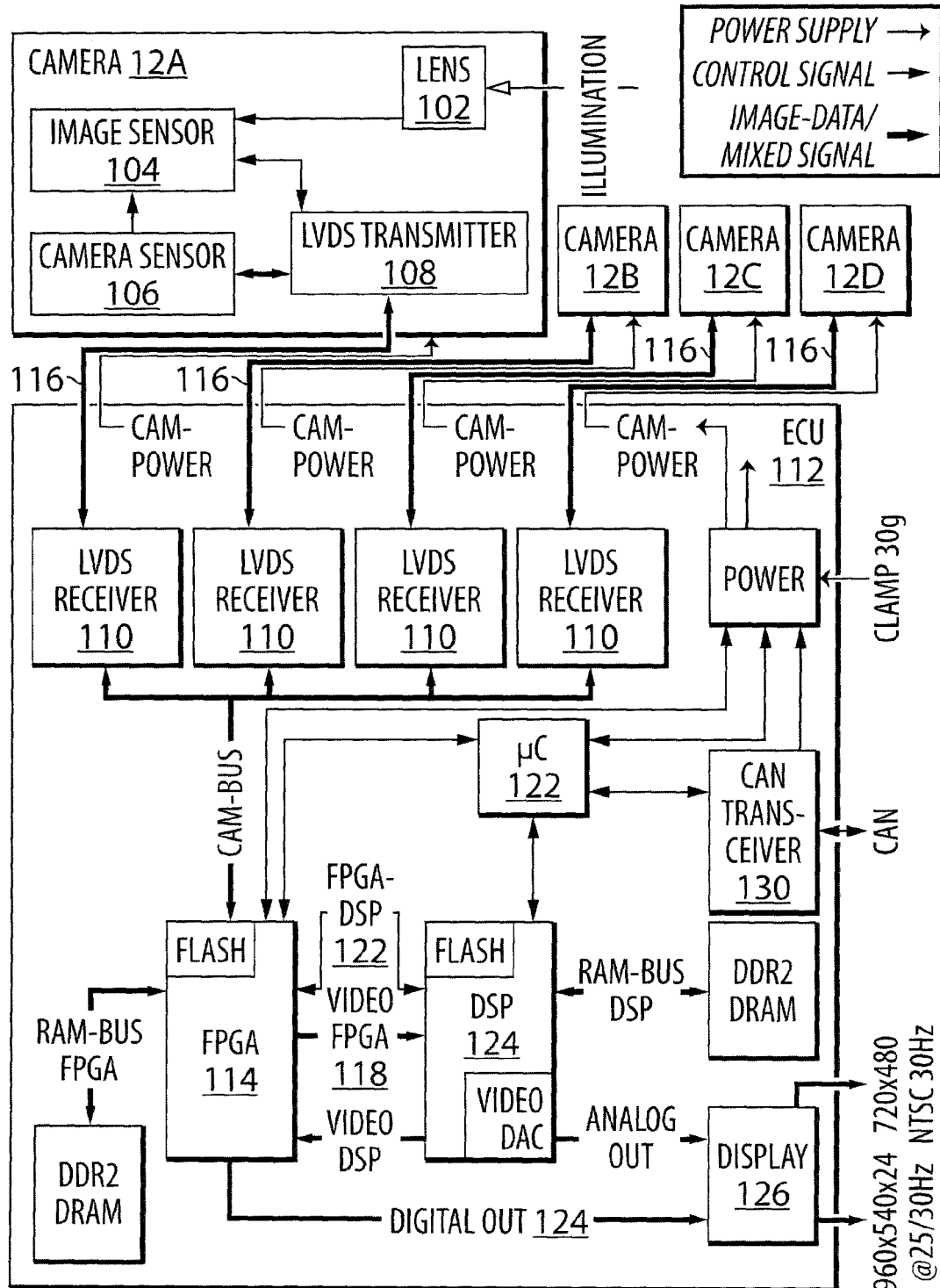
FIG. 8 is a system block diagram from a hardware perspective of the 360 degree vision system.

FIG. 8 shows a hardware schematic for a preferred three-hundred-and-sixty degree vision system 100, which includes the four vehicular cameras 12a-12d, each of which includes a wide angle lens 102 coupled to an image sensor 104, a memory 106 and a transmitter 108. The cameras are coupled via the transmitters 108 to respective receivers 110 on a main electronic control unit (ECU) 112. In this particular embodiment a floating point gate array (FPGA) 114 functions as a multiplexer to provide one of the four camera video streams 116 (each stream comprising successive image frames captured by the camera at a rate of approximately 25-30 frames per second) to an output line 118 that is connected to a digital signal processor (DSP) 120. The DSP 120, in conjunction with an associated microcontroller 122, processes the selected camera video stream and carries out the online calibration (OC) algorithms discussed in detail herein. The FPGA 114 also provides a composite 360 degree view video output 124 to a display driver 126 based on stitching instructions provided by the DSP 120 via a command line 128.

The microcontroller 122 is connected to the vehicle command area network (CAN) via a CAN transceiver 130 and thus can query the main vehicle controller (not shown) for information such as vehicle speed and steering angle.

As summarized above, the OC algorithms according to the first aspect of the invention are based on the concept of vanishing points because the estimation of the camera angles in these algorithms relies on the estimation of the vanishing line. In order to determine the vanishing line, it is necessary to estimate vanishing points corresponding to different orientations of parallel lines in the image. The vanishing line in conjunction with the spatial position of the principal point is used to determine the camera rotational angles.

Ideally, in order to collect various vanishing points in different orientations, there should be various parallel lines with different orientations in the corresponding ground plane. However this is not available in reality since the surrounding view or scene is not a controlled environment. Additionally there exist various external environmental factors preventing a perfect projection of parallel lines into the image plane. Thus the OC algorithm utilizes the relative motion of the vehicle with respect to various feature points in order to generate motion trajectories to replicate the ideal situation in which there are parallel lines available in the input image. By selecting special features in the input images and tracking for short durations, these points move approximately parallel to the vehicle motion and thus are representative of parallel lines with respect to the coordinate system being considered. The intersection point of these trajectories lies on the vanishing point which is to be estimated. When the vehicle turns, the trajectories have a different orientation depending on the angle of turn. The locus or collection of the various vanishing points in respect of the various steering angles corresponds to different orientations of parallel lines, and enables the vanishing line to be estimated.

I. Coordinate System

FIG. 1E shows a vehicle coordinate system that is used in conjunction with the example described in this publication. The vehicle X-axis lies along the longitudinal axis of the vehicle. The vehicle Y-axis lies along the cross-car direction or latitudinal axis of the vehicle. The vehicle Z-axis is the vertical axis (in/out of the page). The origin point (o) is midway along the front wheel drive axis. Each camera associated with the vehicle has its own camera coordinate system where the X-axis always points to the right of the camera, the Y-axis always points away from the camera and the Z-axis is similar to the Z-axis of the vehicle coordinate system. The camera coordinate systems are also illustrated in FIG. 1E. The calibration of each camera is done so that its rotational angles are first estimated with respect to the camera coordinate system, where pitch ($\alpha$), yaw ($\beta$) and roll ($\gamma$) are the rotations around the X-, Y- and Z-axes of the camera coordinate system, respectively. Once calibrated, these rotations can be simply transformed to the equivalent rotations in the vehicle coordinate system as shown in Table 1 below. The rotations around the X-, Y- and Z-axes of the vehicle coordinate system are termed as Rx, Ry and Rz, respectively.

TABLE 1

| Camera | Rz (degree) | Ry(degree) | Rx(degree) |
|---|---|---|---|
| Front | $\gamma + 90$ | $\alpha$ | $-\beta$ |
| Left | $\gamma + 180$ | $-\beta$ | $-\alpha$ |
| Rear | $\gamma + 270$ | $-\alpha$ | $\beta$ |
| Right | $\gamma$ | $\beta$ | $\alpha$ |

Table 2 below shows an example of nominal angular positions of the front 12a, rear 12b and side facing cameras 12c, 12d in a sample vehicle. Note that the roll, pitch and yaw for each camera implies change about a different vehicular axis, e.g., for the front camera pitch is defined as the angle about the vehicle Y-axis and for the right side camera pitch is defined the angle about the vehicle X-axis.

TABLE 2

| Camera | Rz (degree) | Ry(degree) | Rx(degree) |
|---|---|---|---|
| Front | 90 | 62 | 0 |
| Left | 180 | 0 | −12 |
| Rear | 270 | −45 | 0 |
| Right | 0 | 0 | 12 |

II. Front Camera

A system block diagram of an OC algorithm 150 for the front camera 12a in accordance with the first aspect of the invention is shown in FIG. 9. Inputs to the algorithm 150 include: data confirming the active camera 12 (front 12a, rear 12b or side 12c, 12d camera); the intrinsic parameters (principal point, focal length, lens map) for the camera under consideration; and CAN bus data including the instantaneous vehicle speed and steering angle. In an initial module 152 the vehicle speed and steering angle information is recorded for every image frame captured by the algorithm. In a first module 154, the vanishing points are detected using a motion tracking method. In a following module 156, the vanishing line is estimated based on the locus or collection of the estimated vanishing points for the various steering angles. The estimated central vanishing point in conjunction with the vanishing line leads to the final module 158 of the OC algorithm—the computation of the three camera rotational angles in the camera coordinate system, namely, $\alpha$, $\beta$ and $\gamma$.

A. Inputs

Figure 10:
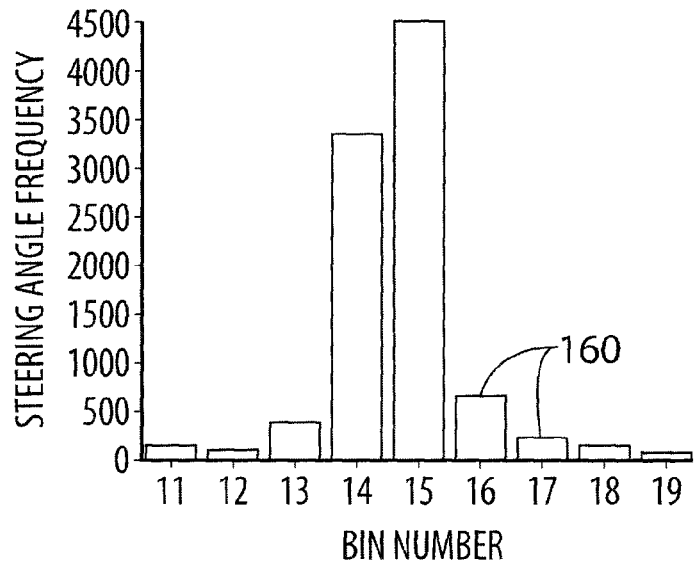
FIG. 10 is a histogram showing distribution of vehicle steering angle over normal driving conditions.
Figure 11:
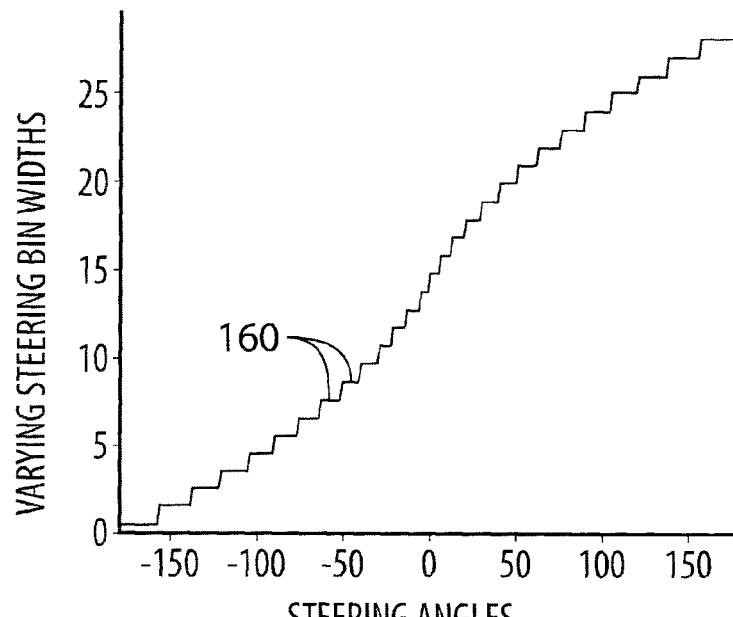
FIG. 11 is a plot showing the size of steering angle bins over the range of steering angles.

The processing of successive image frames in step 152 is conditioned upon two important inputs: steering angle and vehicle speed. The steering angle is one of the major inputs of the OC algorithm 150. Using steering angle data captured during approximately ten hours of normal driving in a variety of scenarios using multiple drivers and with no special maneuvers, the inventors ascertained that during the different driving maneuvers the steering is held almost constant at different corresponding angles within a very small variation range for a computationally reasonable amount of time. FIG. 10 shows a histogram of thirty consecutive frame sets lying in the same steering angle range observed during the normal driving along urban routes by multiple drivers. The steering angle has been partitioned into bins 160 from −180 degrees to +180 degrees in varying increments of 6 degrees or more for this experiment. The way the angles are partitioned is determined by an external function in which the central angles are (−6 to +6 degrees) divided into two central bins with a width of six degrees. The bins have symmetrical structure. The width of the bins for positive and negative angles is the same. The larger the angle becomes the wider the corresponding steering bin. FIG. 11 shows an example of steering bin structure with linear increments for the bins 160 as the angles increase. Note that in alternative embodiments, nonlinear increments for the steering bins 160 may be used.

Furthermore, although with a change in the steering angle the vehicle inscribes a circle, for a very short duration (~<1-2 sec) the path of the vehicle with respect to any point being tracked on the ground could be considered to be a straight line. The sharper the steering angle, the slower the movement of the car and the lesser the distance traveled in a curvature. This further helps to approximate the vehicle motion for very short durations by a straight path even for sharper turns. This allows for the detection of parallel trajectories in the same direction as the path of travel described by the wheels which is at an angle with respect to the vehicular coordinate system. Thus, a different set of vanishing points could be computed for these different set of parallel lines which are at different angles with respect to the vehicular coordinate axes and these vanishing points lie along the vanishing line.

The change in the steering angle from the neutral (or 0 degree) location causes the wheels of the vehicle to move at an angle with respect to the body of the vehicle and thus any points tracked when steering is non-zero inscribe parallel trajectories which are at an angle to the X-axis of the vehicle coordinate system. To maintain linearity and constancy of the inclination of the trajectories, the captured images are processed as a single set for small increments of steering angles.

The estimation of the vanishing point within each steering bin is thus conditioned upon the steering angle, whereby the input images are processed as a single set only if the steering angle is held within a particular range defined as steering bin. With any change in the steering out of the defined range, the previously computed trajectories are stored and the processing of a new set of images for the new steering bin is initiated The estimation of the vanishing point within each steering bin is also conditioned upon the vehicle speed. The speed of the vehicle has no effect in the path the trajectory follows in the image plane other than the fact the trajectory moves at a faster pixel rate across the frame at higher speeds. So, similar to the steering bin, if the speed values are held within a particular range, pre-defined in the algorithm, the speed bin remains constant. If the speed varies out of the defined range a new speed bin is introduced and several parameters such as tracking duration are updated. The new set of features is thus tracked according to the new set of parameters. For instance the increment in the speed bin causes the features to move faster and therefore the tracking duration will be shortened.

B. Vanishing Point Detection

Figure 12:
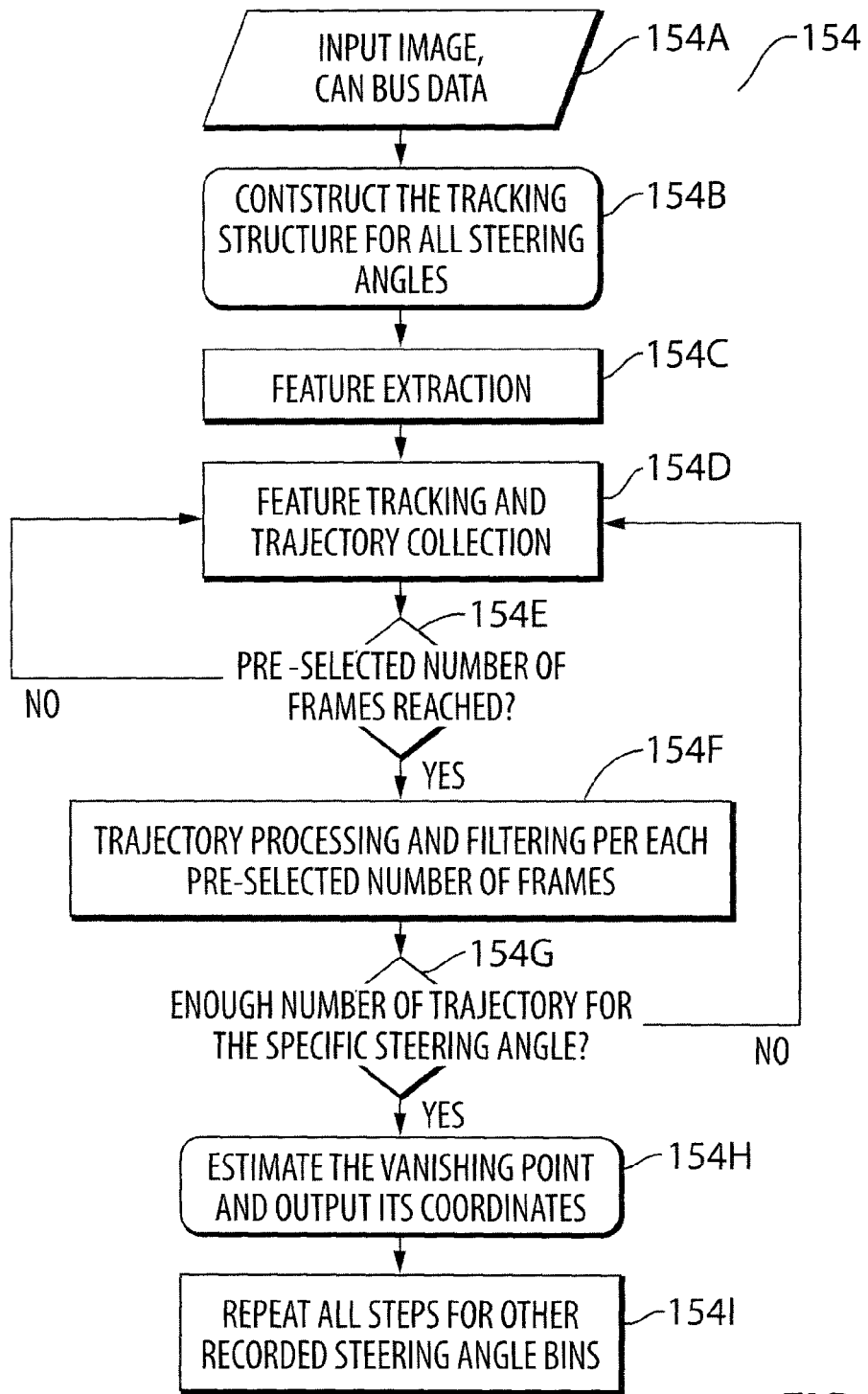
FIG. 12 is a flowchart of a vanishing point detection algorithm.

A flow chart for the vanishing point detection module 154 is shown in FIG. 12. The main inputs 154A to the vanishing point detection module 154 include the image frames of the video stream, steering angle, and vehicle speed. The main goal of this module is to produce the vanishing point based on the available input data.

In an initial step 154B a data structure is constructed for tracking trajectories across a variety of steering angles. In a following step 154C the best features in a region of interest (ROI) that can lead to the determination of the vanishing point are detected and stored. For the front-facing camera, the ROI is close to the visible horizon line. Ideally the ROI should cover the road sides and not that much of the ground.

In the following steps 154D-154G, various feature points are extracted and their motions tracked to generate trajectories. For a pre-configured set of frames (which is a function of speed and steering bin), a new set of features are extracted and tracked over time. The tracking algorithm is based on motion vector estimation using block matching where, for each feature to be tracked in the current frame, a small 8×8 neighborhood around that feature is considered and the best possible match in a small window of pixels in the next frame is found. It is then assumed that the feature in the current frame has moved to the detected location in the next frame. Further information about block matching techniques may be found in Applicants' co-pending patent application PCT/CA2012/000057, filed Jan. 20, 2012 and entitled "Image Processing Method for Detecting Objects Using Relative Motion" and published Nov. 1, 2012 as International Publication No. WO 2012/145819, the contents of which are incorporated by reference herein in their entirety. The collected trajectories are stored and their spatial properties are evaluated per frame set in steps 154H and 154I.

Figure 13:
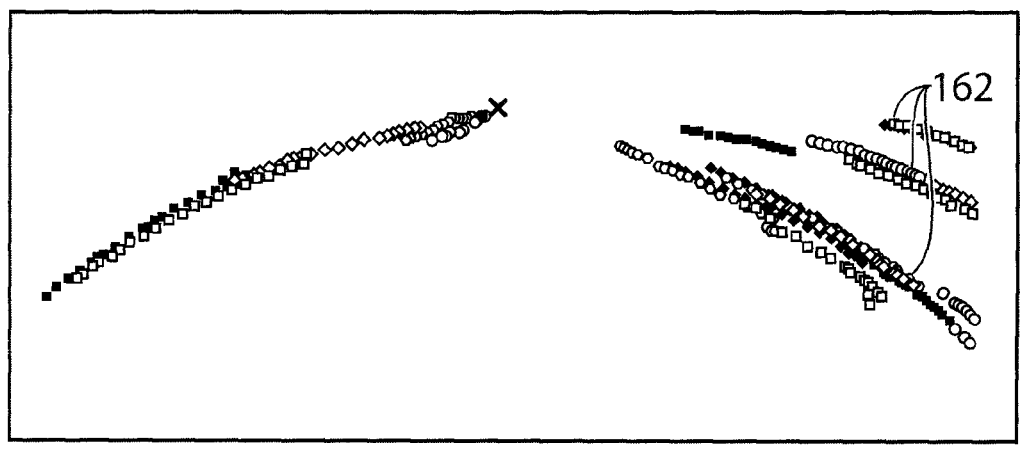
FIG. 13 is a diagram showing feature point motion trajectories in the image plane provided by the front camera.
Figure 14:
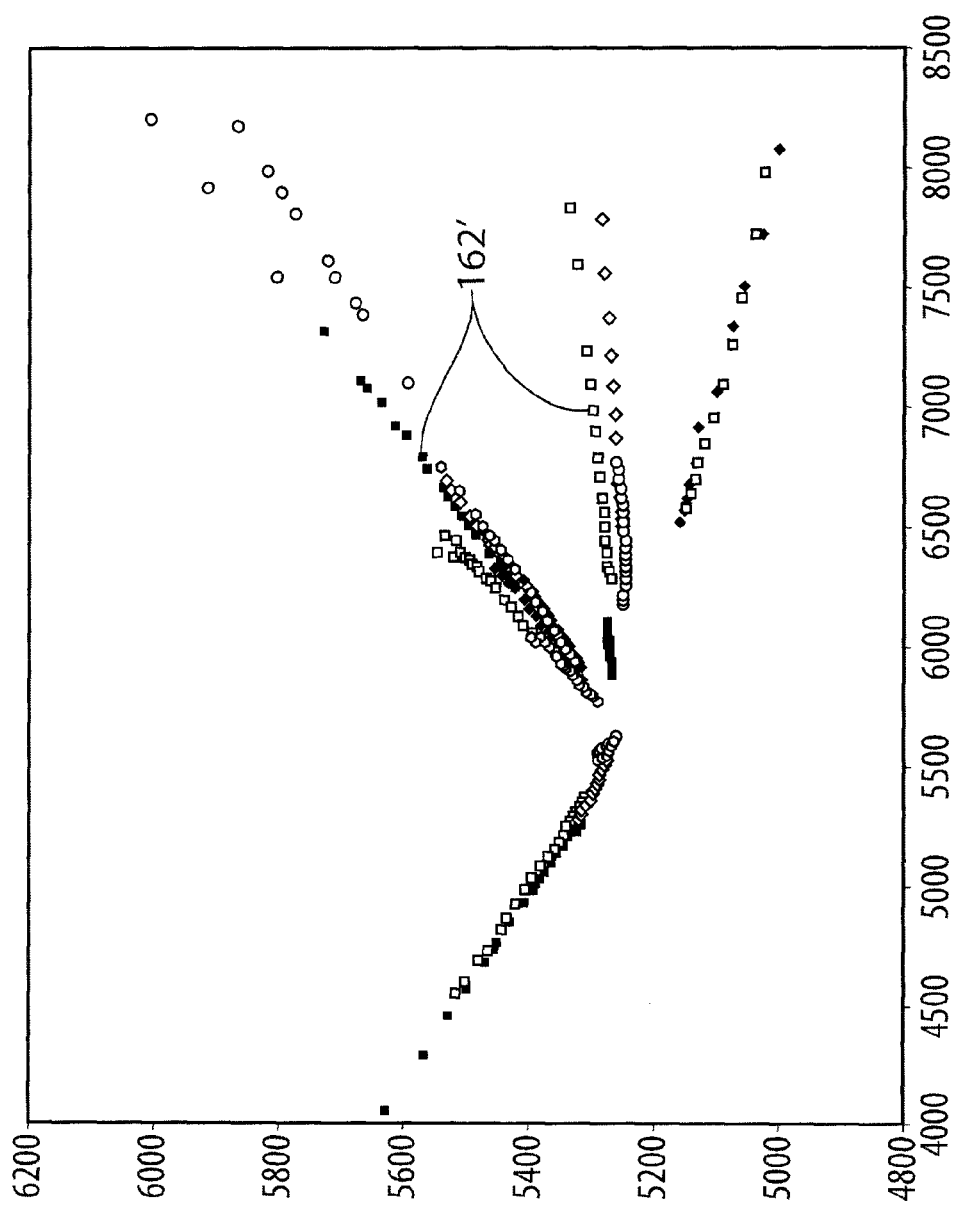
FIG. 14 is a diagram showing de-warped motion trajectories of FIG. 13.
Figure 15:
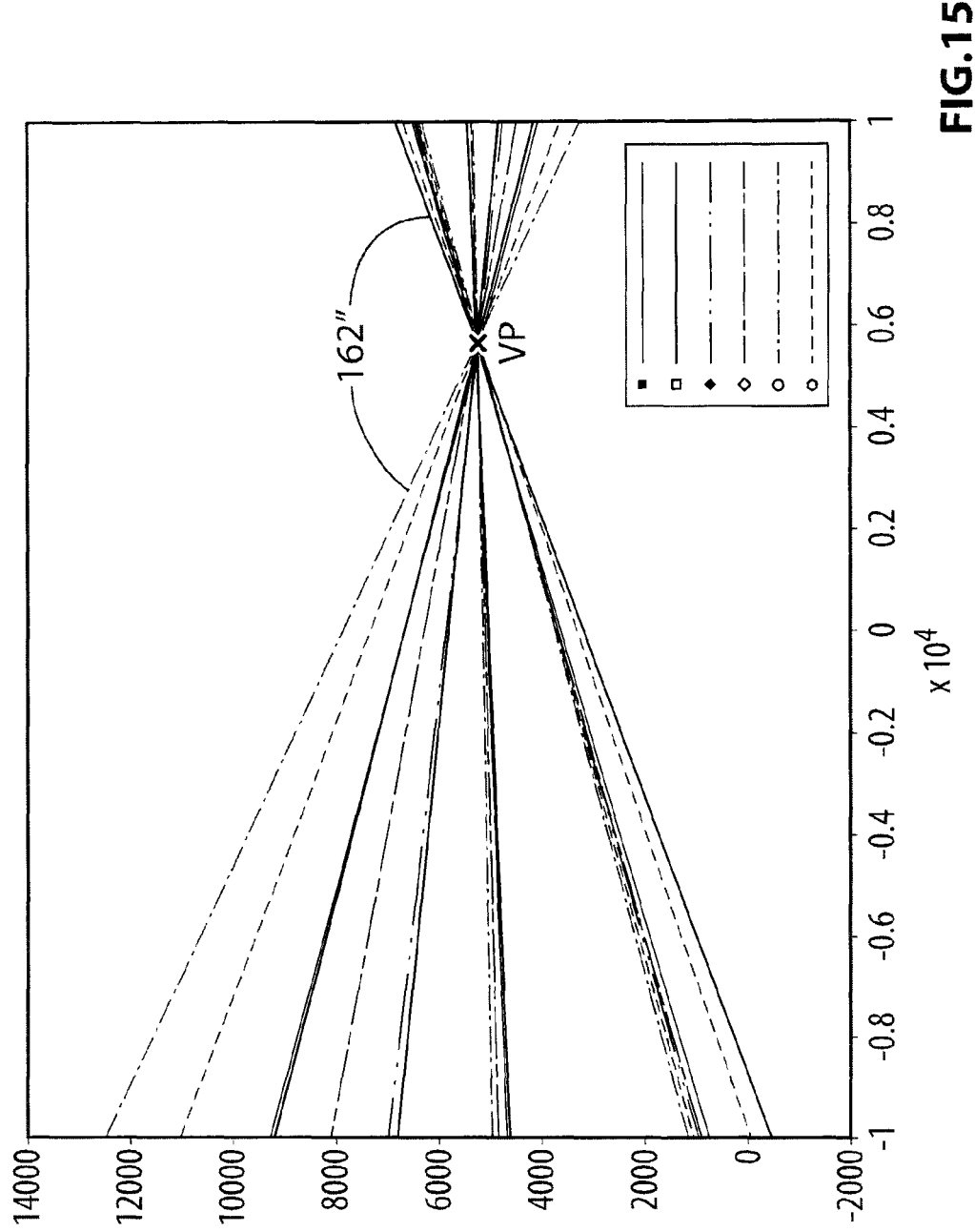
FIG. 15 is a diagram showing linearly fitted, de-warped motion trajectories of FIG. 13, and the location of a vanishing point based on the intersection of such trajectories.

More particularly, in step 154H, the collected trajectories are de-warped. Each trajectory is then linearly fitted using robust regression techniques. If the fitted trajectories meet the criteria set by various threshold (such as sufficient length or time), they are saved. The intersection of these fitted trajectories gives the location of the vanishing point for each steering angle bin. For instance, FIG. 13 shows an example in which trajectories 162 are shown in a warped image space (due to the wide angle lens used in the camera) and FIG. 14 shows trajectories 162' in a de-warped space. FIG. 15 shows the trajectories in the de-warped image linearly fitted to generate substantially linear trajectories 162", enabling a vanishing point VP to estimated. (Note that FIG. 15 is a mirror image of FIG. 14 utilizing a different scale.)

Pseudo code for the vanishing point detection module 154 is presented in FIG. 16. Since the vanishing point is detected and recorded per different steering angle bin, and the threshold values as well as some processing data such as the location of ROI vary depending on the vehicle speed and steering angle, the vanishing point detection module stores the data necessary for the next module in a structured format called a 'trajectory structure'. The number of elements in the trajectory structure depends on the number of steering bins. The most important elements of this structure are:

(a) Steering bin width. Since it is not feasible to account for each single angle, the bins have been designed to include a group of angles. The range of angles allocated to each bin is determined by an external function.

(b) Pre-configured set of frames. The duration for which each feature is tracked is determined by this number of frames. After reaching this number a new set of features are selected and tracked. The estimation of vanishing points is also conditioned upon the number of frames. The duration of the tracking is dependent upon the steering angle range in consideration, with a sharper steering angle being accounted for by a shorter track length translated into smaller number of frames.

(c) ROI location. The image region in which the initial features are selected.

(d) Number of features threshold per trajectory. The minimum number of features each trajectory must have in order to be qualified for further processing.

(e) Number of trajectories for estimation of vanishing point. A minimum number of trajectories are preferably needed to find the vanishing point.

As shown, at the initial stage, the speed bin value is checked and the trajectory structure is updated accordingly. After this step, the code checks a few conditions and depending on the condition, different tasks are performed. If during the tracking process a speed bin change occurs, the trajectory structure is updated. The updated trajectory parameters are not applied to the tracking process, until the next set of tracking. This will not affect the performance since the speed bin does not vary in a shorter time frame than the tracking duration.

C. Vanishing Line Detection

Figure 17:
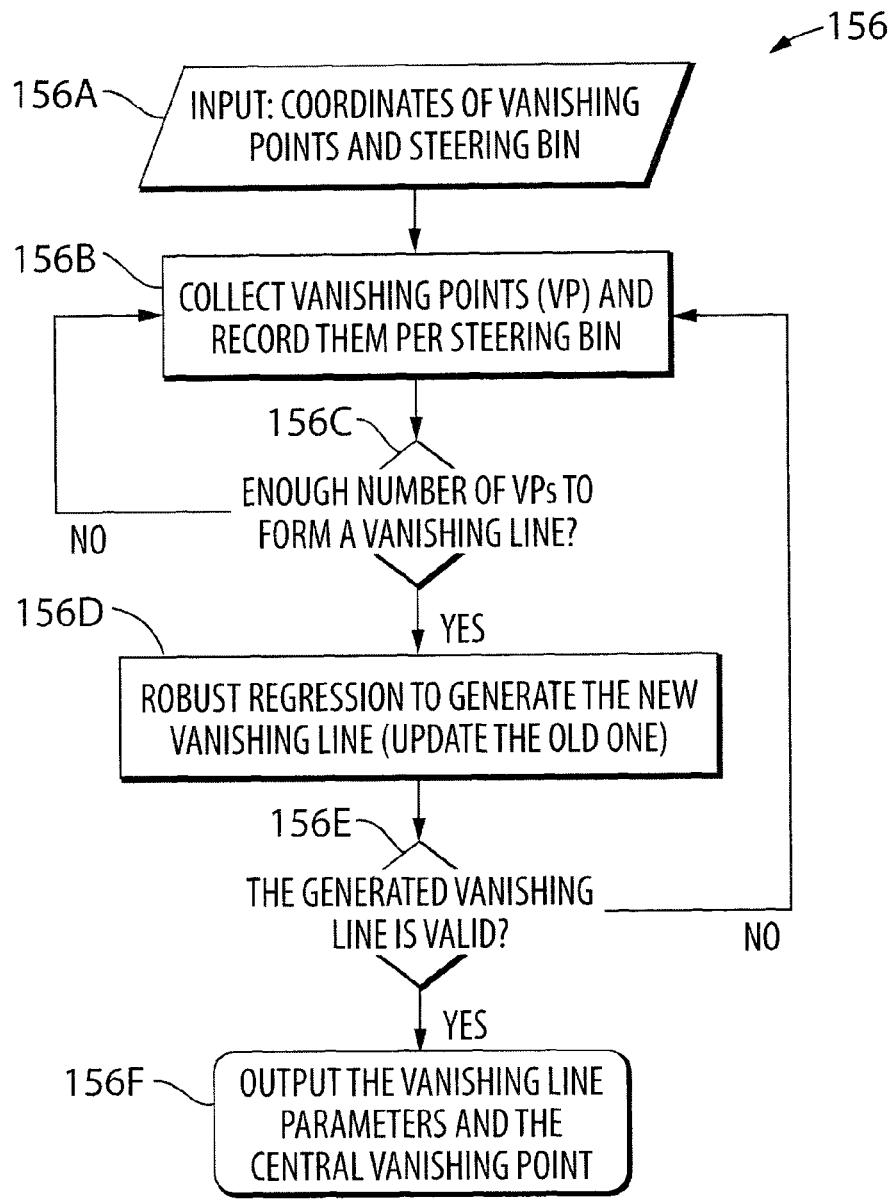
FIG. 17 is a flowchart of a vanishing line detection algorithm.

A self-explanatory flowchart of the vanishing line detection module 156 is shown in FIG. 17. This module is the intermediate step between the vanishing point and the camera rotational angle estimation modules 154, 158. The vanishing line is estimated using a collection of vanishing points obtained during the different normal driving turning maneuvers of the vehicle. Since the estimated vanishing points lie on the visible vanishing line, the best vote vanishing points for each steering range can be used to estimate the vanishing line using a robust fitting scheme. The estimation of the vanishing point in each bin itself is preferably further refined by statistical voting. To estimate the vanishing line, a well-known robust regression technique in which the linear line parameters are iteratively estimated using least square method has been applied at step 156D.

D. Rotation Angle Estimation

Figure 18:
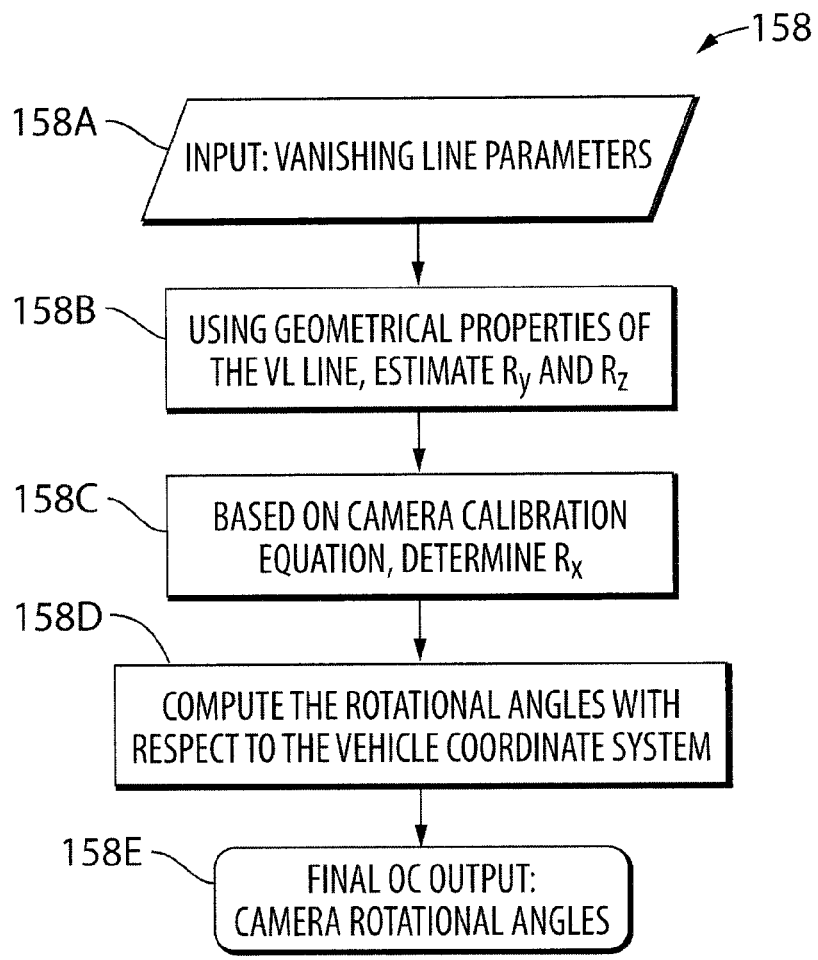
FIG. 18 is a flowchart of a rotational angle estimation algorithm.

Once the vanishing line is estimated, the parameters of the vanishing line are used as inputs to the rotational angle estimation module 158. The output of this module is the final OC output—the camera rotational angles. FIG. 18 shows a flowchart of the algorithm used in this module. Note that the initial output 158E of this module is with respect to the camera coordinate system. The rotations in the camera coordinate system can then be transformed to the vehicle coordinate system as shown in Table 1.

Figure 19:
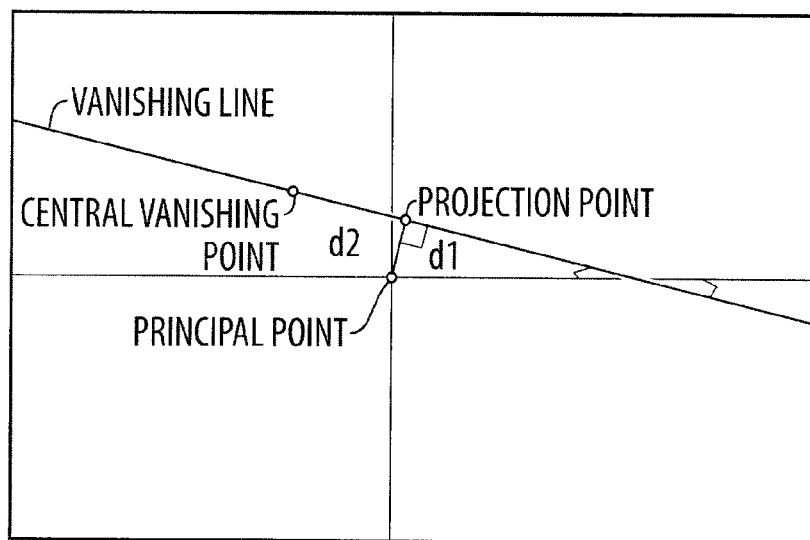
FIG. 19 is a diagram showing various vanishing point and vanishing line parameters in the image plane which are used by the rotational angle estimation algorithm.

Referring additionally to FIG. 19, knowing the location of the principal point, the vertical distance $d_1$ of this point to the vanishing line as well as the distance $d_2$ of a projection point to the central vanishing point are computed. Based on the geometrical relationship between the vanishing line and the actual camera angles, $\alpha$ and $\beta$ angles are estimated. Note that the X, Y, and Z coordinates are the camera coordinate system axes as shown in FIG. 1E.

It has been discovered that the $\alpha$ and $\beta$ angles map uniquely to the $d_1$ and $d_2$ distances, so in order to estimate these angles a lookup table is employed. This lookup table is created by varying the front camera $\alpha$ and $\beta$ angles and recording the resultant $d_1$ and $d_2$ distances for each combination of input $\alpha$ and $\beta$ angles. A small portion of a sample lookup table is presented in Table 3 below. The $d_1$ and $d_2$ distances can be used as indexes into the lookup table for the determination of the $\alpha$ and $\beta$ angles. (It should also be understood that the exact relationship between $\alpha$, $\beta$ and $d_1$, $d_2$ will differ depending on the particular arrangements and selection of cameras for each target vehicle.)

TABLE 3

| $d_1$ | $d_2$ | α | β |
|---|---|---|---|
| 152.5087 | 3.2576 | 62.6000 | −0.5000 |
| 152.5114 | 2.6061 | 62.6000 | −0.4000 |
| 152.5134 | 1.9546 | 62.6000 | −0.3000 |
| 152.5149 | 1.3030 | 62.6000 | −0.2000 |
| 152.5158 | 0.6515 | 62.6000 | −0.1000 |
| 152.5161 | 0.0000 | 62.6000 | 0 |
| 152.5158 | 0.6515 | 62.6000 | 0.1000 |
| 152.5149 | 1.3030 | 62.6000 | 0.2000 |
| 152.5134 | 1.9546 | 62.6000 | 0.3000 |
| 152.5114 | 2.6061 | 62.6000 | 0.4000 |
| 152.5087 | 3.2576 | 62.6000 | 0.5000 |

To find the roll angle or γ, the camera calibration equation is used to solve for the only unknown parameter. The camera calibration equation is defined as:

$$\begin{bmatrix} x \\ y \\ z \end{bmatrix} = K\, R\, T \begin{bmatrix} X \\ Y \\ Z \end{bmatrix} \qquad (1)$$

where X, Y, and Z are the camera coordinate system and the coordinates (x/z, y/z) are the image coordinates. The K parameter is the matrix of the camera intrinsic parameters as shown in equation (2):

$$K = \begin{bmatrix} \dfrac{-f}{\text{pixel Size}} & 0 & \text{axis}X \\ 0 & \dfrac{f}{\text{pixel Size}} & \text{axis}Y \\ 0 & 0 & 1 \end{bmatrix} \qquad (2)$$

where f is the focal length, axisX and axisY are the coordinates of the principal point. The matrix R is the combination of three rotational matrices shown in equation (3):

$$R = R_z R_y R_x = \begin{bmatrix} \cos\gamma & \sin\gamma & 0 \\ -\sin\gamma & \cos\gamma & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix} \qquad (3)$$

where parameters α, β, and γ represent the angles of rotation around camera coordinate system axes X, Y, and Z, respectively. The matrix T is the translation matrix shown in equation (4):

$$T = \begin{bmatrix} 1 & 0 & 0 & -t_1 \\ 0 & 1 & 0 & -t_2 \\ 0 & 0 & 1 & -t_3 \end{bmatrix} \qquad (4)$$

where $t_1$, $t_2$, and $t_3$ are the translations along X, Y, and Z axes. Assuming the world coordinates of the central vanishing point on the ground plane of the camera coordinate system to be X=0, Y=∞, Z=0, the projection in the image plane (cvpX=image x coordinate of the central vanishing point in the image plane) is already estimated. Thus, for the projection of the central vanishing point onto the image plane, x=cvpX and y=cvpY. Note that the world coordinates of the central vanishing point are independent of the camera's position with respect to the vehicle.

Replacing K, R, and T in equation (1) with known α, β, X, Y, Z, x, and y, results in equation (5) in which only the angle γ in $R_y$ is unknown.

$$A \cos\gamma + B \sin\gamma = C$$

where, $$A = f \sin\alpha \sin\beta$$

$$B = f \cos\alpha$$

$$C = (\text{cvp}X - \text{axis}X)\sin\alpha \cos\beta \qquad (5)$$

By solving the sinusoidal equation, the last rotation angle, roll or γ, is estimated.

III. Rear Camera

The approach for the rear camera 12b is similar to the approach for the front camera 12a discussed above. However the ROI location will be different since the tracking direction is the opposite of the front camera. And the angle/distance lookup table will also be different due to the different geometries involved.

IV. Side Camera

The side cameras 12c, 12d, which are installed in the mirrors on the side of the vehicle, also need to be calibrated online during the life cycle of the system 100 to assure the seamless stitching of the images captured by all four cameras. It is feasible to use an algorithm similar to the OC algorithm 150 for front and rear cameras to calibrate the side cameras.

Those skilled in the art will understand that a variety of modifications may be made to the particular embodiments discussed herein without departing from the fair scope of the invention as defined by the following claims.

The invention claimed is:

1. A method of dynamically calibrating without manual intervention a forward viewing vehicular camera with respect to its three rotational degrees of freedom, the method comprising:

disposing a forward viewing camera at a vehicle, the forward viewing camera, when disposed at the vehicle, having a field of view exterior and forward of the vehicle;

providing a control having a processor operable for processing image data captured by the forward viewing camera;

driving the vehicle so that the vehicle is in motion;

wherein driving the vehicle comprises steering the vehicle so as to establish a plurality of vehicle steering angles;

operating the forward viewing camera to acquire multiple frames of image data captured by the forward viewing camera while the vehicle is in motion and steered within at least two ranges of steering angles, wherein each frame of captured image data defines an image plane having a horizontal axis and a vertical axis;

determining, via processing at the control of a first image frame of image data captured by the forward viewing camera, first and second feature points in the first image frame of captured image data;

tracking, via processing at the control of image frames of image data captured by the forward viewing camera subsequent to the first image frame, a motion trajectory of the first feature point and of the second feature point while the vehicle is moving and steered within a first range of steering angles;

determining a first vanishing point based on the tracked first feature point and second feature point;

determining, via processing at the control of a second image frame of image data captured by the forward viewing camera, third and fourth feature points in the second image frame of captured image data;

tracking, via processing at the control of image frames of image data captured by the forward viewing camera subsequent to the second image frame, a motion trajectory of the third feature point and of the fourth feature point while the vehicle is moving and steered within a second range of steering angles that is different from the first range of steering angles;

determining a second vanishing point based on the tracked third feature point and fourth feature point;

determining a vanishing line based on the first and second vanishing points;

determining whether the vanishing line is non-parallel to the horizontal axis of the image plane; and responsive to determining that the vanishing line is non-parallel to the horizontal axis of the image plane, adjusting at least one selected from the group consisting of pitch of the forward viewing camera, roll of the forward viewing camera and yaw of the forward viewing camera to correct for rotational misalignment of the forward viewing camera.

2. The method of claim 1, wherein the first range of steering angles comprises steering angles close to or at zero degrees such that the vehicle is traveling in a straight line.

3. The method of claim 2, wherein, when the vehicle turns, motion of the vehicle is approximated as straight line motion for a travel time of 0.5 to 2 seconds.

4. The method of claim 3, wherein approximation to straight line motion when the vehicle turns is vehicle speed dependent.

5. The method of claim 4, wherein approximation to straight line motion when the vehicle turns occurs for 0.5 to 2 seconds of travel time after turning from straight line travel.

6. The method of claim 1, wherein image data captured by the forward viewing camera is processed at the control for at least one selected from the group consisting of (i) object detection, (ii) lane departure warning and (iii) automatic high beam control.

7. The method of claim 1, wherein the forward viewing camera comprises a wide angle lens, and wherein the method comprises removing distortion caused by use of the wide angle lens.

8. The method of claim 1, wherein the forward viewing camera is part of a multi-camera vision system of the vehicle.

9. The method of claim 8, wherein the multi-camera vision system of the vehicle comprises the forward viewing camera and three other vehicular cameras.

10. The method of claim 9, wherein image data captured by at least two of the four cameras of the multi-camera vision system is stitched together to provide a composite image for display to a driver of the vehicle.

11. The method of claim 1, comprising receiving at the control vehicle data via a communication bus of the vehicle.

12. The method of claim 11, wherein the received vehicle data includes vehicle speed data and vehicle steering angle data.

13. The method of claim 11, wherein the communication bus of the vehicle comprised a CAN bus.

14. The method of claim 13, wherein the forward viewing camera captures at least 25 frames of image data per second.

15. A method of dynamically calibrating without manual intervention a forward viewing vehicular camera with respect to its three rotational degrees of freedom, the method comprising:

disposing a forward viewing camera at a vehicle, the forward viewing camera, when disposed at the vehicle, having a field of view exterior and forward of the vehicle;

providing a control having a processor operable for processing image data captured by the forward viewing camera;

driving the vehicle so that the vehicle is in motion;

wherein driving the vehicle comprises steering the vehicle so as to establish a plurality of vehicle steering angles;

operating the forward viewing camera to acquire multiple frames of image data captured by the forward viewing camera while the vehicle is in motion and steered within at least two ranges of steering angles, wherein each frame of captured image data defines an image plane having a horizontal axis and a vertical axis;

determining, via processing at the control of a first image frame of image data captured by the forward viewing camera, first and second feature points in the first image frame of captured image data;

tracking, via processing at the control of image frames of image data captured by the forward viewing camera subsequent to the first image frame, a motion trajectory of the first feature point and of the second feature point while the vehicle is moving and steered within a first range of steering angles, wherein the first range of steering angles comprises steering angles close to or at zero degrees such that the vehicle is traveling in a straight line;

determining a first vanishing point based on the tracked first feature point and second feature point;

determining, via processing at the control of a second image frame of image data captured by the forward viewing camera, third and fourth feature points in the second image frame of captured image data;

tracking, via processing at the control of image frames of image data captured by the forward viewing camera subsequent to the second image frame, a motion trajectory of the third feature point and of the fourth feature point while the vehicle is moving and steered within a second range of steering angles, wherein the second range of steering angles comprises steering angles that do not include angles close to or at zero degrees such that the vehicle is traveling along a curve;

determining a second vanishing point based on the tracked third feature point and fourth feature point;

determining a vanishing line based on the first and second vanishing points;

determining whether the vanishing line is non-parallel to the horizontal axis of the image plane; and responsive to determining that the vanishing line is non-parallel to the horizontal axis of the image plane, adjusting at least one selected from the group consisting of pitch of the forward viewing camera, roll of the forward viewing camera and yaw of the forward viewing camera to correct for rotational misalignment of the forward viewing camera.

16. The method of claim 15, wherein image data captured by the forward viewing camera is processed at the control for at least one selected from the group consisting of (i) object detection, (ii) lane departure warning and (iii) automatic high beam control.

17. The method of claim 15, wherein the forward viewing camera comprises a wide angle lens, and wherein the method comprises removing distortion caused by use of the wide angle lens.

18. The method of claim 15, wherein the forward viewing camera is part of a multi-camera vision system of the vehicle, and wherein the multi-camera vision system of the vehicle comprises the forward viewing camera and three other vehicular cameras.

19. The method of claim 18, wherein image data captured by at least two of the four cameras of the multi-camera vision system is stitched together to provide a composite image for display to a driver of the vehicle.

20. The method of claim 15, comprising receiving at the control vehicle data via a communication bus of the vehicle, and wherein the received vehicle data includes vehicle speed data and vehicle steering angle data.

21. A method of dynamically calibrating without manual intervention a forward viewing vehicular camera with respect to its three rotational degrees of freedom, the method comprising:
- disposing a forward viewing camera at a vehicle, the forward viewing camera, when disposed at the vehicle, having a field of view exterior and forward of the vehicle;
- providing a control having a processor operable for processing image data captured by the forward viewing camera;
- driving the vehicle so that the vehicle is in motion;
- wherein driving the vehicle comprises steering the vehicle so as to establish a plurality of vehicle steering angles;
- operating the forward viewing camera to acquire multiple frames of image data captured by the forward viewing camera while the vehicle is in motion and steered within at least two ranges of steering angles, wherein each frame of captured image data defines an image plane having a horizontal axis and a vertical axis;
- determining, via processing at the control of a first image frame of image data captured by the forward viewing camera, first and second feature points in the first image frame of captured image data;
- tracking, via processing at the control of image frames of image data captured by the forward viewing camera subsequent to the first image frame, a motion trajectory of the first feature point and of the second feature point while the vehicle is moving and steered within a first range of steering angles;
- determining a first vanishing point based on the tracked first feature point and second feature point;
- determining, via processing at the control of a second image frame of image data captured by the forward viewing camera, third and fourth feature points in the second image frame of captured image data;
- tracking, via processing at the control of image frames of image data captured by the forward viewing camera subsequent to the second image frame, a motion trajectory of the third feature point and of the fourth feature point while the vehicle is moving and steered within a second range of steering angles that is different from the first range of steering angles;
- determining a second vanishing point based on the tracked third feature point and fourth feature point;
- determining a vanishing line based on the first and second vanishing points;
- determining whether the vanishing line is non-parallel to the horizontal axis of the image plane;
- receiving at the control vehicle data via a communication bus of the vehicle, and wherein the received vehicle data includes vehicle speed data and vehicle steering angle data;
- responsive to determining that the vanishing line is non-parallel to the horizontal axis of the image plane, adjusting at least one selected from the group consisting of pitch of the forward viewing camera, roll of the forward viewing camera and yaw of the forward viewing camera to correct for rotational misalignment of the forward viewing camera; and
- wherein image data captured by the forward viewing camera is processed at the control for at least one selected from the group consisting of (i) object detection, (ii) lane departure warning and (iii) automatic high beam control.

22. The method of claim 21, wherein, when the vehicle turns, motion of the vehicle is approximated as straight line motion for a travel time of 0.5 to 2 seconds.

23. The method of claim 22, wherein approximation to straight line motion when the vehicle turns is vehicle speed dependent.

24. The method of claim 23, wherein, when the vehicle turns from steering angles close to or at zero degrees, approximation to straight line motion occurs for 0.5 to 2 seconds of travel time after the vehicle turns.

* * * * *